United States Patent [19]

Bayon

[11] 4,270,657
[45] Jun. 2, 1981

[54] HOLDING NET, PARTICULARLY FOR THE STOWING OF LOADS ON PALLETS AND THE LIKE

[75] Inventor: Patrice M. Bayon, Avrillé, France

[73] Assignee: L'Aiglon, Maine et Loire, France

[21] Appl. No.: 47,782

[22] Filed: Jun. 11, 1979

[30] Foreign Application Priority Data

Jun. 12, 1978 [FR] France .............................. 78 17535

[51] Int. Cl.³ .......................................... B65D 19/00
[52] U.S. Cl. .................................. 206/386; 108/55.1; 108/55.5; 206/597; 428/224; 428/225; 428/255; 428/257
[58] Field of Search .............. 428/224, 255, 257, 225; 206/386, 597; 108/55.1, 55.5

[56] References Cited

U.S. PATENT DOCUMENTS

| 3,575,777 | 4/1971 | Allport | 428/107 |
| 4,000,344 | 12/1976 | Dilbey | 428/255 |
| 4,136,501 | 1/1979 | Connolly | 428/255 |
| 4,157,411 | 6/1979 | Thomson | 428/255 |

Primary Examiner—James J. Bell
Attorney, Agent, or Firm—Browdy & Neimark

[57] ABSTRACT

The net is made from straps formed with bridging openings and which are crossed over by means of interlaced passages, a strap, folded on itself, forming each time a mesh row.

12 Claims, 9 Drawing Figures

U.S. Patent  Jun. 2, 1981  Sheet 1 of 4  4,270,657

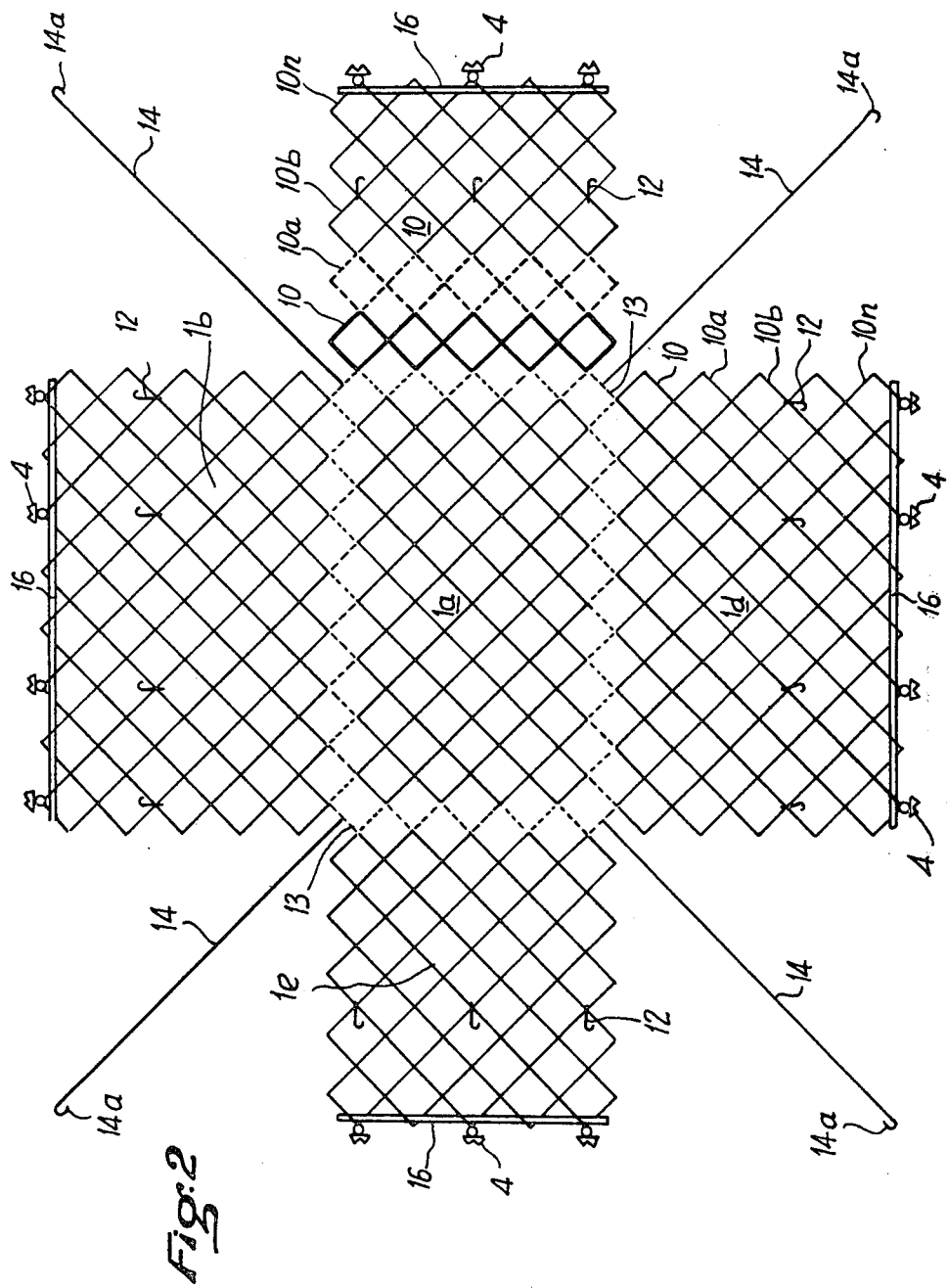

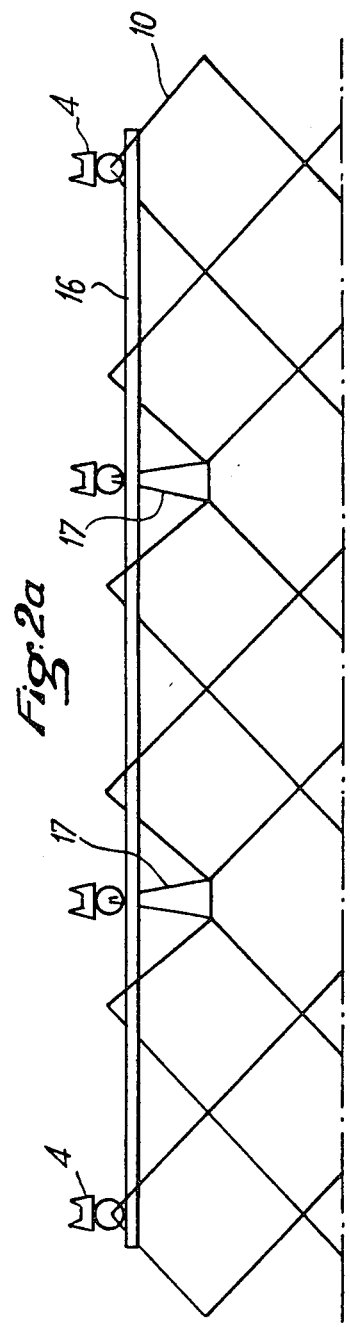
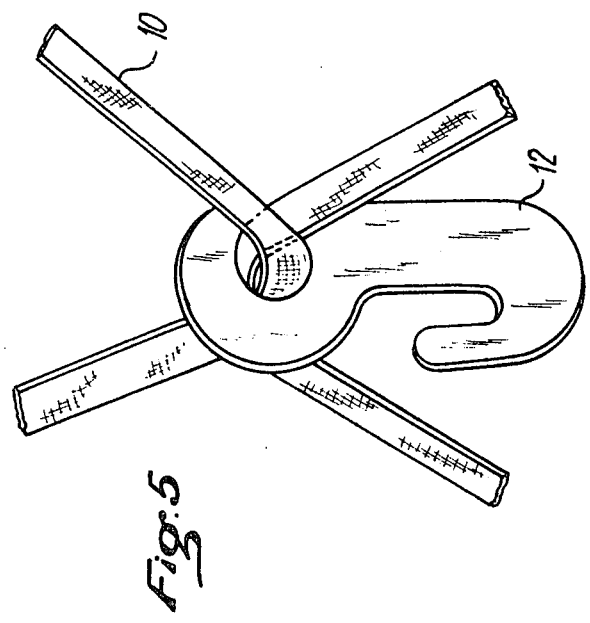

HOLDING NET, PARTICULARLY FOR THE STOWING OF LOADS ON PALLETS AND THE LIKE

The present invention relates to a holding net particularly adapted for the stowing of loads on pallets used in land, sea and air transportations.

The use of nets for the transhipment and stowing of goods is known since long. These nets are usually manufactured from ropes, straps or cables, which are connected together by knots, seams or splices. However, the nets made according to these known methods exhibit various disadvantages. In fact, when they are damaged, it is very difficult and most often even impossible to repair them. Moreover, the making of the many knots, seams and splices is long and costly.

The object of the present invention is to remedy such disadvantages by providing a stowing net which can be easily manufactured, repaired and modified.

According to the invention, the holding net, particularly for the stowing of loads on pallets, is characterized in that it is made from straps formed with bridging openings delimiting crossed lengths passing respectively through the bridging openings of an adjacent length.

Figure 1:
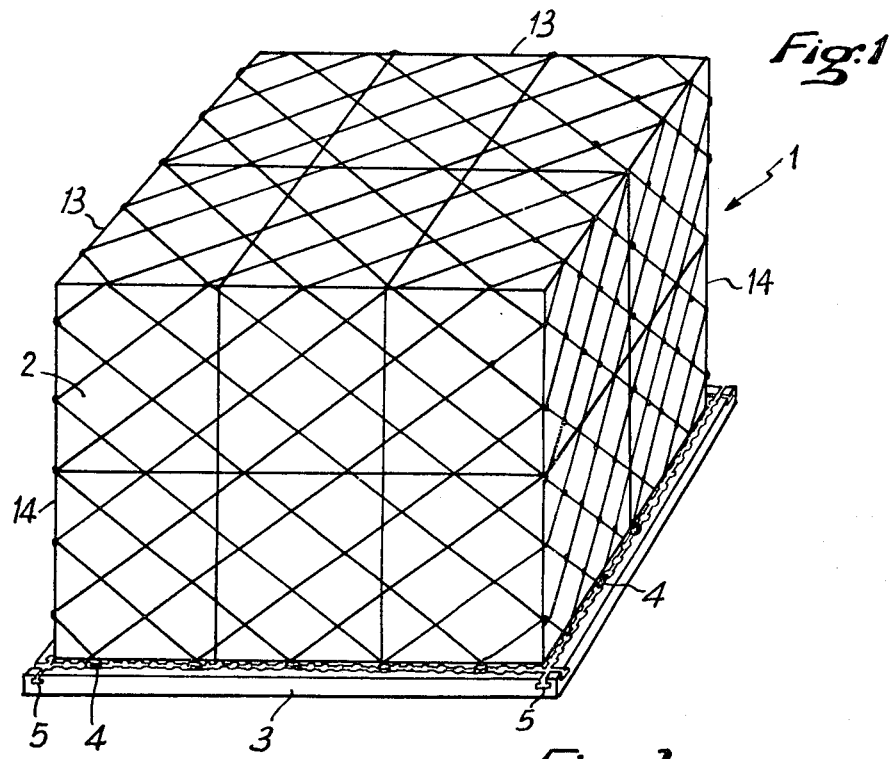
Figure 3:
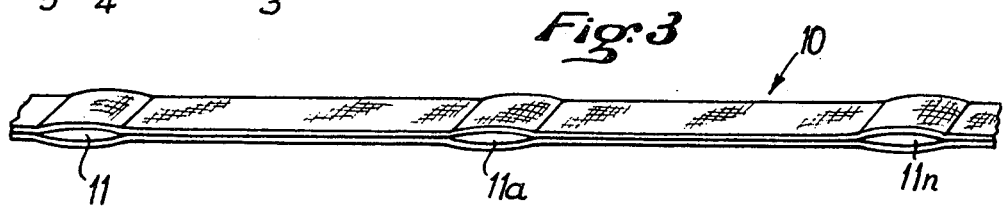
Figure 4:
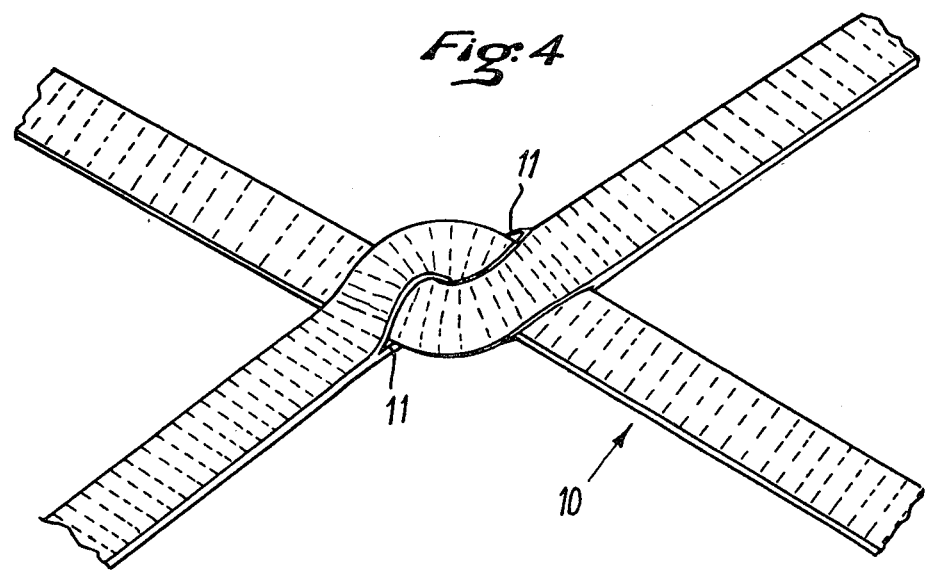
Figure 6:
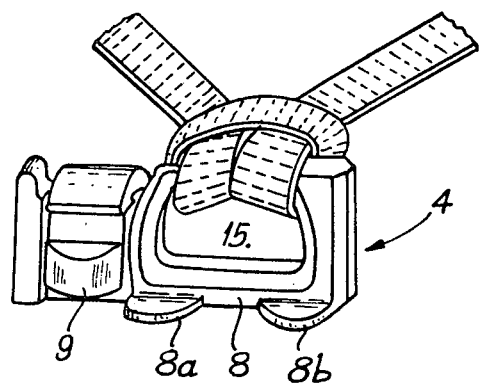
Figure 7:
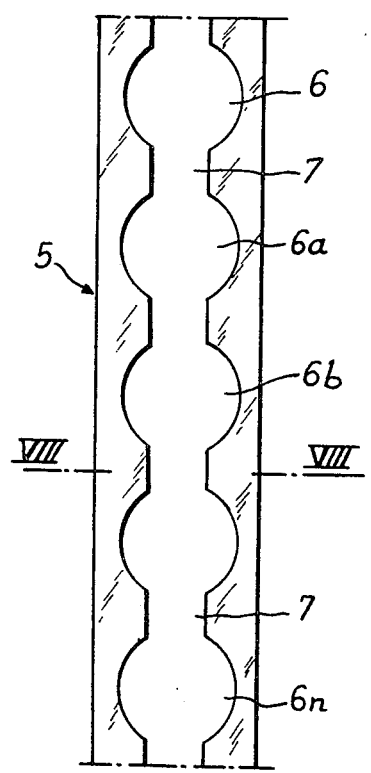
Figure 8:
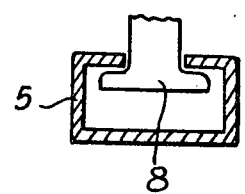

Various other features of the invention will become more apparent from the following detailed description of an embodiment of the invention which is given as a non limitative example, reference being made to the accompanying drawings wherein:

FIG. 1 is a perspective view of a pallet loaded with objects stowed by means of a net embodying the invention, FIG. 2 is a developed plane of the net of FIG. 1, FIG. 2a is an enlarged partial plane view of an edge of the net and shows a detail of constitution of the net, FIG. 3 is a partial perspective view of a strap formed with bridging openings used in the net of the invention, FIG. 4 is an enlarged perspective view of a junction interlacing of two segments of straps with bridging openings of FIG. 3, FIG. 5 is an enlarged perspective view showing a detail of construction, FIG. 6 is an enlarged perspective view of another detail of construction, FIG. 7 is an enlarged diagrammatic plane view of a detail of FIG. 1, and FIG. 8 is a cross-sectional view taken along line VIII—VIII of FIG. 7.

Referring now to the drawings, FIG. 1 shows a net 1 according to the invention, which is used for the stowing of various objects 2 laid on a pallet 3. In the example shown, the edges of the net 1 are fixed to the pallet 3 by means of dogs 4 (FIG. 6) and rails 5 (FIGS. 7 and 8) provided respectively on the longitudinal and transverse edges of the net as regards the dogs, and of the pallet 3 as regards the rails. However, it is possible to use other fixation means: nevertheless, the fixation of the net 1 through the dogs 4 and the rails 5 is particularly advantageous due to the quickness with which the dogs 4 may be engaged in and disengaged from the rails 5.

As shown in FIGS. 7 and 8, the rails 5, known per se, are profiled members of rectangular cross-section in the upper face of which are formed circular and equidistant openings 6, 6a, 6b to 6n, these openings being connected together through a connecting slit 7.

The dogs 4, one example of which is shown in FIG. 6, have a width slightly smaller than that of the slit 7 of the rail 5 and comprise a pad 8 formed on both sides with two semi-circular protrusions 8a, 8b. The distance between axes of the protrusions 8a, 8b corresponds to that of two neighbouring openings of the rail 5, thereby providing the engagement of the dog 4 in the rail 5.

Immobilization of the dogs 4 inside the rail 5 (FIG. 8) is provided by a lock 9 which may be resiliently engaged into one of openings 6, 6a, 6b to 6n under action of a spring. The lock 9 prevents any accidental disengagement of the dogs 4 since the distance separating it from the two semi-circular protrusions of the pad 8 does not correspond to the distance between axes of the protrusions and, due to this fact, does not also correspond to that of two neighbouring openings 6, 6a of the rail 5.

The fixation mode as hereabove described is known per se in the case of an aeronautic pallet, but it has been described in detail in order to make the invention and its advantages better understood.

The net 1, which is the object of the invention, is realized in panels made from straps 10, 10a, 10b to 10n formed with equidistant bridging openings 11, 11a to 11n (FIG. 3).

FIG. 2 illustrates a net 1 from five panels 1a, 1b, 1c, 1d and 1e.

A row of meshes of the net is each time made by a strap 10, 10a to 10n formed with bridging openings 11, 11a to 11n, folded over in order to form two lengths. At the intersection points of the lengths, the strap is twice interlaced (FIG. 4) by passing one length in the bridging opening of the other length. This operation is then repeated from a strap to the other, as shown for the successive rows 11a to 11n. At the end of each row, the straps are stopped by a knot and a seam, or a seam only.

When making the net 1, one incorporates from time to time hooks 12 (FIGS. 2 and 5) in the side panels 1b, 1c, 1d and 1e, the hooks 12 tensioning the net 1 when in use. The connection between the central panel 1a and the peripheral panels 1b, 1c, 1d and 1e is provided by lacing straps 13. Likewise, lacing straps 14 are also used for connecting, by means of half meshes, the edges of the panels 1b, 1c, 1d and 1e.

The last mesh row of the peripheral panels 1b, 1c, 1d and 1e, adapted for being fixed to pallet 3, is provided with dogs 4 attached by a loop formed by the end of a mesh, said loop being passed in the eye 15 of the dog 4 and then folded over about the dog as shown in FIG. 6. This fixation mode of the dogs 4 has the advantage that they can be easily disassembled and replaced. In order to avoid any accidental loss of the dogs 4, a locking and marking flat strap 16 is passed through the bridging openings which are in the vicinity of the fixation dogs 4. The ends of the marking strap 16 are stopped by a seam. It is advantageous that the marking strap be of a conspicuous colour.

The final shape of the net 1 is obtained by connecting the side edges of the peripheral panels 1b, 1c, 1d and 1e of the net by means of the lacing straps 14 fixed to the net at one of their ends by a knot or a seam, the other end being provided with a hook 14a.

In order to avoid a deformation of the net 1 when being fixed to the edges of the pallet 3, it is advantageous to provide, in the row of lower meshes of the side panels 1b, 1c, 1d and 1e, and in various positions, narrower meshes 17 of triangular shape which are connected to fixation dogs 4 in the manner described hereabove (FIG. 2a).

The invention is not restricted to the embodiment shown and described in detail, since various modifications may be carried out with departing from its scope as shown by the appendant claims. For instance, it is possible to make by means of this method, and using straps formed with bridging openings, nets of different shapes, and the use of said nets is not limited to the stowing of goods. It is only important that each mesh row of the net is formed by a strap folded over and that the two lengths thus obtained are interlaced together and with the lengths of the strap forming the row of neighbouring meshes.

I claim:

1. A holding net made from a plurality of individual straps each having a plurality of openings passing therethrough along its length and, each being interwoven by passage through said openings to form a diamond-shaped mesh row, the improvement wherein each alternate diamond-shaped mesh row of the net is formed of two lengths of a single strap connected together at the free ends thereof, alternate diamond-shaped mesh rows being formed of different individual straps and diamond-shaped mesh rows therebetween being formed by adjacent, different straps.

2. A net according to claim 1, comprising rectangular panels assembled together by lacing and knotting.

3. A net according to claim 1, comprising side panels with hooks incorporated therein in order to tension the net.

4. A holding net made from a plurality of individual straps each having a plurality of openings passing therethrough along its length and, each being interwoven by passage through said openings to form a diamond-shaped mesh row, the improvement wherein the net has a last row of meshes with ends of the meshes provided with attachment means.

5. A net according to claim 4, wherein the attachment means comprises fixation dogs engaging rails provided on edges of a pallet to be used with the net for stowing loads on the pallet.

6. A holding net made from a plurality of individual straps each having a plurality of openings passing therethrough along its length and, each being interwoven by passage through said openings to form a diamond-shaped mesh row, the improvement wherein the net has side panels each with a row of end meshes comprising at intervals narrower meshes of a triangular shape.

7. A net according to claim 4, wherein a marking strip is passed in openings which are in vicinity of the attachment means.

8. A net according to claim 4, wherein the net has side panels with hooks incorporated therein in order to tension the net.

9. A net according to claim 4 comprising several panels assembled together by lacing and knotting.

10. A holding net made from straps, each being formed therein with a plurality of openings and delimiting lengths each passing respectively through openings of an adjacent length, the improvement wherein the net has side panels each with a row of end meshes comprising at intervals narrower meshes of a triangular shape.

11. A net according to claim 10 wherein the net has side panels with hooks incorporated therein in order to tension the net.

12. A net according to claim 10, comprising several panels assembled together by lacing and knotting.

* * * * *

UNITED STATES PATENT AND TRADEMARK OFFICE
CERTIFICATE OF CORRECTION

PATENT NO. : 4,270,657
DATED : June 2, 1981
INVENTOR(S) : Patrice M. BAYON

It is certified that error appears in the above-identified patent and that said Letters Patent are hereby corrected as shown below:

Column 3, line 5, "with" should read --without--

Column 4, lines 10-17, delete these lines and insert therefor as follows:

-- 6. A net according to claim 5, wherein the fixation dogs are connected to the net by passing a loop of a mesh in an eye of each of the dogs and then by passing the dog in a loop so formed.--

Column 4, lines 26-31, delete these lines and insert therefor as follows:

--10. A holding net made of a plurality of individual straps each having a plurality of openings passing therethrough along its length and, each being interwoven by passage through said openings to form a diamond-shaped mesh row, the improvement wherein the net has side panels each with a row of end meshes comprising at intervals narrower meshes of a triangular shape.--

Signed and Sealed this

Ninth Day of February 1982

[SEAL]

Attest:

GERALD J. MOSSINGHOFF

Attesting Officer      Commissioner of Patents and Trademarks